April 26, 1955
J. PETERS
2,707,203
ELECTRICAL JUNCTION BOX
Filed March 31, 1954
2 Sheets-Sheet 1
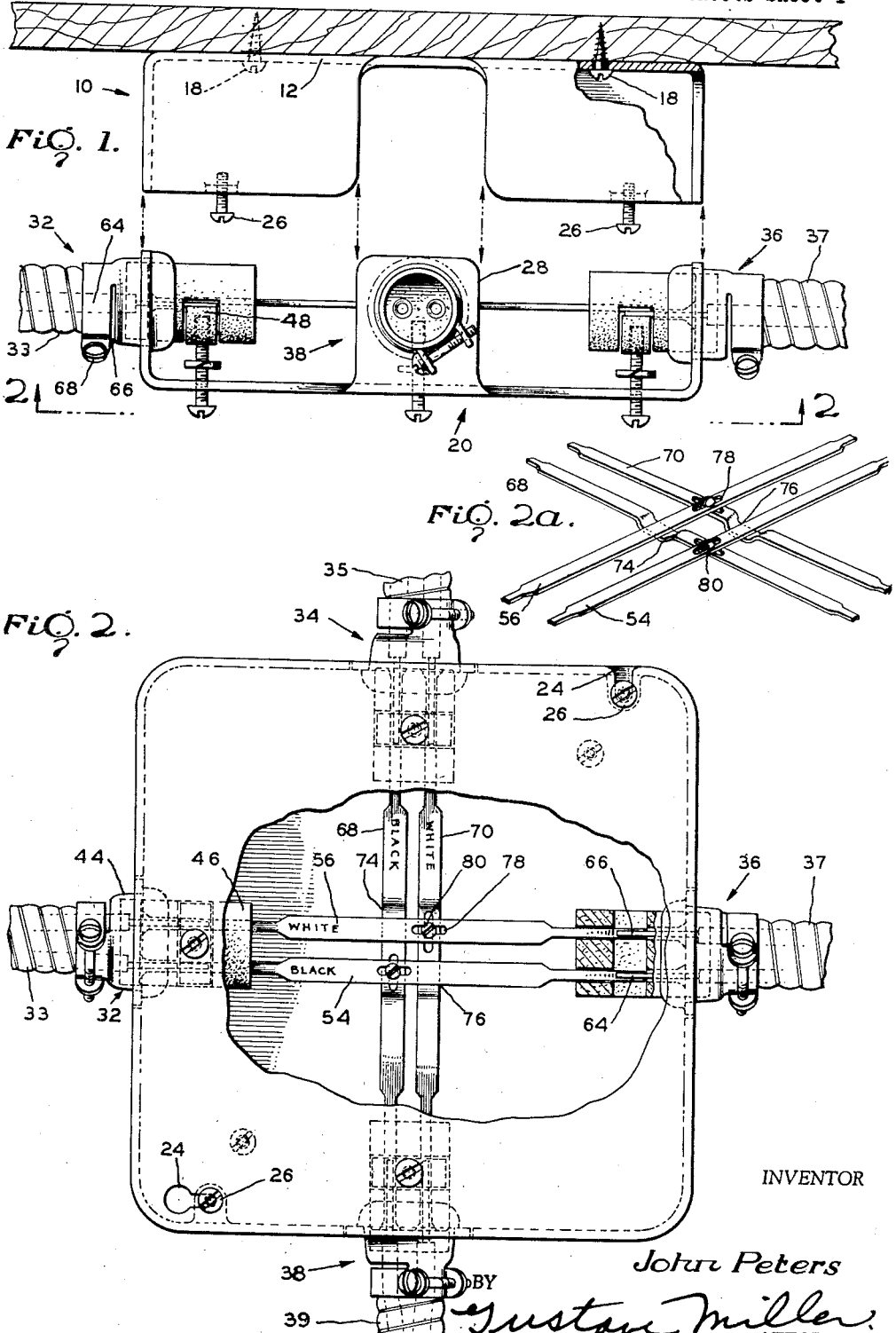
INVENTOR
John Peters
BY
Gustav Miller
ATTORNEY April 26, 1955
J. PETERS
2,707,203
ELECTRICAL JUNCTION BOX
Filed March 31, 1954
2 Sheets-Sheet 2
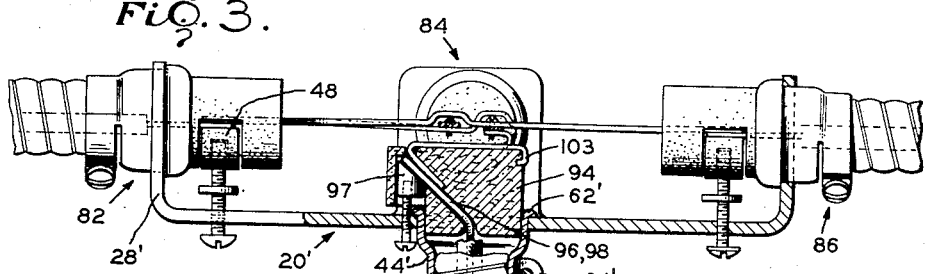
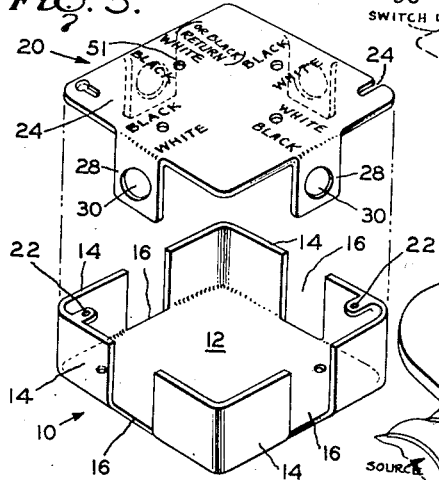
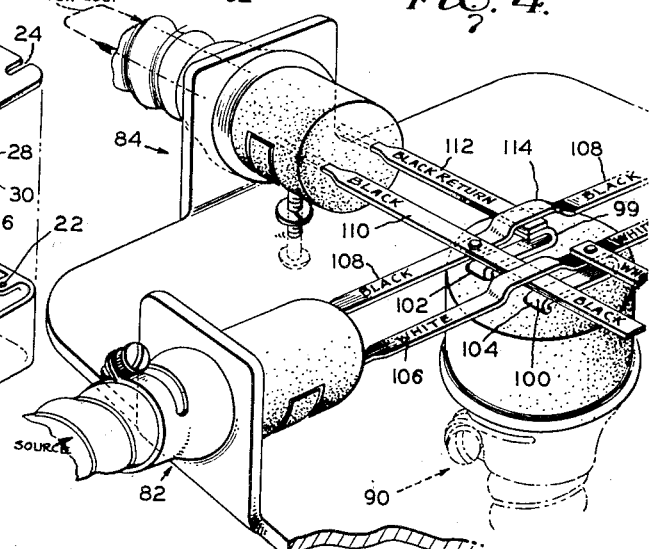
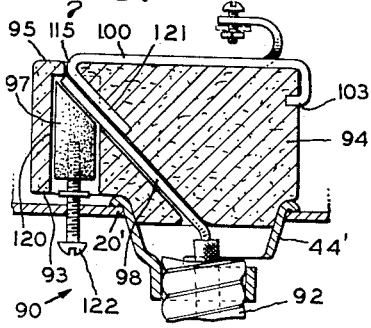
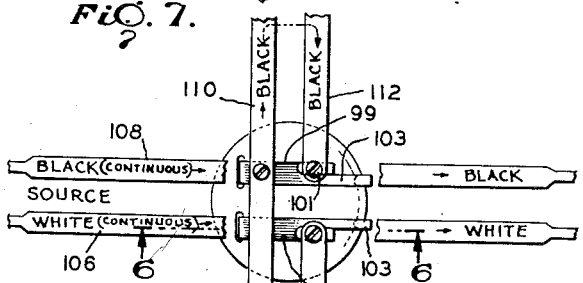
INVENTOR
John Peters
Gustav Miller
ATTORNEY United States Patent Office 2,707,203
Patented Apr. 26, 1955

2,707,203

ELECTRICAL JUNCTION BOX

John Peters, West Bath, Maine

Application March 31, 1954, Serial No. 419,969

1 Claim. (Cl. 174—59)

This invention relates to junction or outlet boxes used in electrical wiring systems.

Electrical outlet boxes of the type used in conventional electrical wiring systems usually involve a number of time consuming operations. The various wires connected together at the outlet box must be cut, have their insulation removed for the connection, then be twisted together, taped and soldered. Furthermore, the present method of joining the various combinations of wires at the outlet box provides a definite possibility of error in making these necessary connections.

Accordingly, it is an object of this invention to provide a simple and convenient electrical outlet or junction box for use in electrical wiring systems.

It is a further object of this invention to provide an electrical outlet box in which the necessary electrical connections can be made without taping, or soldering and with a considerable saving of time as compared to presently used outlet boxes.

It is a further object of this invention to provide an electrical outlet box which is suitable for use in any of the various wiring combinations commonly encountered in electrical wiring systems, such as feeder entering and three feeders leaving a junction box, feeder in, feeder out, lamp circuit and switch loop, or other wiring combinations.

In achievement of these objectives, this invention provides an electrical outlet box in which the connections between the various outlets of the given box are made by means of bus bars. The ends of the bus bars and the ends of the armored cable to which the bus bars are connected at the outlet box are received in an insulating plug member supported by the outlet box, and a screw operated insulating wedge number is received in a slot in the plug member in order to force the ends of the bus bars into electrical contact with the ends of the armored cable conductors.

Further objects and advantages of the invention will become apparent from the following specification taken in connection with the accompanying drawings in which Fig. 1 is an exploded side elevation view of an outlet box in accordance with the invention; Fig. 2 is a bottom plan view of the assembled outlet box of Fig. 1, taken substantially on the line 2—2 of Fig. 1, and with part of the cover of the box broken away in order to better illustrate the internal connections; Fig. 2–a is a perspective view showing the method of crossing two sets of bus bars; Fig. 3 is a side elevation view, partly in section, of a modified embodiment of the invention having a center outlet; Fig. 4 is an enlarged perspective view showing the details of the circuitry to the center outlet of the embodiment of Fig. 3; Fig. 5 is an exploded view of the outlet box of Figs. 1 and 2; Fig. 6 is an enlarged vertical sectional view of the center outlet as seen substantially on line 6—6 of Fig. 7; Fig. 7 is a top plan view of the bus connections used in the embodiment of Figs. 3 and 4; and Fig. 8 is an enlarged fragmentary perspective exploded view showing the assembly of the connector parts of one of the side outlets of either the embodiment of Figs. 1 and 2 or the embodiment of Figs. 3–4.

Referring now to the drawings, and more particularly to Figs. 1, 2, 2–a, 5 and 8, the outlet box comprises a box-like portion generally indicated at 10 having a base 12 and four sides 14. Each of the sides 14 is provided intermediate its length with a slot 16 which extends in a perpendicular direction from the base 12 for the entire height of the respective side 14. The base portion 12 is rigidly secured to a suitable mounting surface by means of the screws 18. A cover member, generally indicated at 20, is adapted to enclose the box-like portion 10. The box portion 10 is provided with inwardly extending apertured ears or tabs 22 which register with the slots 24 of the cover member 20. Screws 26 pass through the slots 24 and the apertures of tabs 22 and serve to hold the cover 20 in place with respect to the box portion 10.

The cover 20 is provided along each of its four edges with an ear 28 which lies in a plane substantially perpendicular to the plane of the cover member 20. Each ear 28 is adapted to be received in a corresponding slot opening 16 of one of the respective sides 14 when cover 20 engages box portion 10. With cover 20 in position on box portion 10, the ears 28 lie in the plane of the respective sides 14. Each of the ears 28 is provided with a circular aperture 30 to receive the connector members as will now be described.

The outlet box of Figs. 1 and 2 serves as a means of interconnecting armored cables 33, 35, 37, and 39 which respectively enter the four outlets which are respectively indicated at 32, 34, 36 and 38. For example, cable 33 may be an incoming feeder line, and cables 35, 37 and 39 may be outgoing feeder lines. These cables are of the armored type, such as those known in the trade as BX or Romax. The connector components and their method of assembly at each of the outlets 32, 34, 36 and 38 are the same and therefore the components and assembly for only one of these outlets, namely, outlet 32, will be described. It is understood that the other outlets 34, 36 and 38 are the same.

As may be seen in Figs. 1, 2, 2–a and 8, the components at junction 32 include the armored cable 33 having two conductors 40 and 42, a clamp member 44, a plug member 46 of insulating material, a wedge lock 48 of insulating material, a screw 50 for operating the wedge lock 48 into a slot 52 of the plug member 46, and a pair of bus bars 54 and 56 which pass into the plug member 46 and engage the respective conductors 40 and 42 of the armored cable 33. The cable 33, the clamp 44, the plug 46 and the bus bars 54 and 56 all lie in aligned relation with each other.

The plug 46 is of generally cylindrical shape and is suitably drilled at one end to receive the reduced ends of bus bar members 54 and 56. The bus bars 54 and 56 are preferably made of a flexible brass stock approximately $\frac{1}{32}$ of an inch thick by $\frac{1}{4}$ to $\frac{5}{16}$ inch width, and of sufficient current carrying capacity to exceed the normal requirements for the junction box.

As will best be seen in Fig. 8, the outer end of the plug 46 is provided with tapered passages 58 provided with countersunk openings 60 to receive the conductors 40 and 42 of the armored cable 33. The tapered and countersunk construction of the passages 58 facilitates the insertion of cable conductors 40 and 42 into plug 46. The plug 46 is provided intermediate of its length with a transverse slot 52 which extends from the outer surface of plug 46 to substantially the center longitudinal axis of the plug. As will be explained later, slot 52 of plug 46 is adapted to receive the wedge lock 48. The plug 46 is made of any insulating material having good dielectric qualities and of sufficient mechanical strength.

The wedge lock 48 is preferably made of the same material as the plug 46 and of such size as to substantially fill the slot 52. The wedge lock is carried at the end of a screw 50 which passes through a tapped hole 51 in cover 20. Rotation of screw 50 in a clockwise direction with respect to the view shown in Fig. 8, causes wedge 48 to move radially inwardly in the slot 52 of plug 46.

The clamp member 44 is of a metallic material and serves to clamp the cable 33 and the plug 46 in assembled relation with respect to each other and with respect to the ear 28 of the cover 20.

The connector clamp 44 is of tapered shape being of a larger diameter at its inner portion where it joins the plug 46 than at its outer end where it joins the cable 33. Connector clamp 44 is provided with a shoulder 62 at its inner end adjacent plug 46, the shoulder 62 serving as an abutment which rests against the inner surface of the ear 28 and prevents clamp 44 from passing all the way through aperture 30 of ear 28. The diameter of the aperture 30 through which the connector clamp 44 passes and the diameter of the inner end of the clamp 44 should be so proportioned as to provide a very close or forced fit when the connector 44 is forced through hole 30 until the shoulder 62 rests against the inner surface of the ear 28. The outer end of connector 44 is provided with clamping ears 64 which are separated from the remaining portion of the connector 44 by a slot 66 which extends for approximately 1/3 of the circumference of the connector member to provide flexibility of the ears 64. A screw member 68 serves as a means of clamping the ears 64 together to engage the outer sheath of the armored cable 33. The diameter of the connector member 44 at its outer end adjacent the clamping ears 64 is such as to permit an easy passage of this portion of the connector clamp through the aperture 30 of the ear 28.

The component parts of the junction 32 just described are assembled from the center outwardly. The bus bars 54 and 56 are inserted in the slots in the plug 46 until they extend into the transverse slot 52. The outer end of plug 46 is inserted into the inner end of the connector clamp 44. The connector clamp 44 is forced through the aperture 30 until the shoulder 62 abuts the inner surface of ear 28. The conductors 40 and 42 are inserted through the outer end of the clamp member 44 and into the tapered countersunk passages 58 of the plug 46. The conductors 40 and 42 are passed through the passages 58 until they pass into the slotted portion 52 of the plug 46. Then, holding the armored cable 33 firmly against the plug 46, the wedge lock screw 50 which passes through the tapped hole 51 in the cover 20 of the receptacle box is turned in a clockwise direction to thereby cause the wedge member 48 which is connected to the inner end of screw 50 to move into the slot 52 in such manner as to clamp the conductors 40 and 42 into engagement with the respective bus bars 54 and 56. A lock washer 53 is pressed into a groove in the screw 50 to limit the degree of upward movement of the screw 50 to prevent the wedge 48 from being completely retracted from the slot 52 when the screw 50 is turned in the unclamping or counterclockwise direction.

As will best be seen in the views of Figs. 2 and 2–a, the bus bars 54 and 56 extend across the junction box and into electrical connection with the conductors 64 and 66 of the armored cable 37 of the outlet 36. The conductors 54 and 56 are identified by the color code black and white respectively. The bus bars 68 and 70 extend perpendicularly to bus bars 54 and 56 and between the outlets 34 and 38 of the junction box. The bus bars 68 and 70 have the color code black and white respectively. The bus bar 68 is offset from bus bar 56, as indicated at 74, passing under the bus bar 56, in order to prevent electrical contact between bus bars of different potential. Bus bar 68 is then connected to bus bar 54. In a similar manner the bus bar 70 is connected to the bus bar 56 but is offset at 76 in order to pass under the bus bar 54. Each pair of joined bus bars, that is, bus bars 68 and 54, and bus bars 70 and 56 are provided with slots 78, and bolt and nut connections 80 cooperate with the slots 78 to hold each respective pair of connected bus bars together in proper electrical contact. The slots 78 permit a limited degree of longitudinal adjustment of the respective bus bars in order to facilitate assembly of the bus bars with respect to their junction connections.

As will best be seen in Fig. 5, the cover 20 of the outlet box is provided adjacent each junction with the color code to indicate the proper positioning of the respective black and white conductors.

As shown in Figs. 3, 4, 6 and 7, a modified outlet box in accordance with the invention is provided which permits the attachment of a fifth or center outlet which may be used, for example, for ceiling lighting fixtures, or cellar drop lamps. This modified outlet box also provides a switch loop for the fifth outlet. The modified junction box of Figs. 3, 4, 6 and 7 includes four outlets 82, 84, 86 and 88 (outlet 88 is not shown in the drawing) which respectively pass through ears 28' of the cover member 20'. The components and the assembly of the junction members 82, 84, 86 and 88 are the same as those previously described for the junctions 32, 34, 36 and 38 of the embodiment of Figs. 1 and 2 and hence will not be described again. In addition, an outlet generally indicated at 90 extends through a centrally located aperture in the surface of the cover member 20'. The components at this outlet include an armored cable 92 having conductors 96 and 98, a clamp 44' which is substantially the same as the clamp 44 previously described in connection with the embodiment of Fig. 1, a wedge lock plug 94, and a wedge 97. The plug 94 is of substantially cylindrical shape, but is not positioned in symmetrical alignment with the cable 92, the clamp 44', or with the aperture in the cover 20' through which clamp 44' passes. Instead, the portion 95 of plug 94 is laterally offset with respect to the axis of connector 44' and cable 92. Furthermore, the outer or lower end of laterally offset portion 95 is cut away as indicated at surface 93 so that the lower end of portion 95 is spaced a short distance above the inner surface of cover 20' when the remaining portion of the same end of plug 94 is gripped by clamp 44'.

The laterally offset portion 95 of plug 94 is provided with a passage 120 which extends parallel to the axis of the plug, and extends from the lower surface 93 for nearly the entire height of the plug. The upper end surface of the passage 120 is inclined as indicated at 121 (Fig. 6). The passage 120 receives a wedge member 97 operated by a screw 122 which passes through a tapped hole in cover 20'. The wedge member 97 is movable in the passage 120 under the influence of screw 122 to clamp the conductors of cable 92 to the sub-bus bars 99 and 100, as will be explained.

The connector clamp member 44' is provided with a shoulder 62' which engages the inner surface of the cover 20'. The outer end of the connector clamp 44' is provided with clamping ears 64' which are adapted to clamp the outer sheath of the armored cable 92.

The plug 94 is provided with a pair of spaced slots 102, 104 extending at a substantially 45 degree angle and into communication with the upper end of passage 120 in which the wedge member 97 is movable. Each of the cable conductors 96 and 98 extends through one of these slots, the respective conductors 96 and 98 being maintained in spaced relation with respect to each other by the spaced position of the slots. A pair of short sub-bus bars 99 and 100 are arranged so that their respective ends extend through openings in the upper surface of plug 94 and into a communication with the upper end of passage 120.

The circuit arrangement of the embodiment shown in Figs. 3, 4, 6 and 7 provides a switch loop through outlet 84 for the center outlet 90. The bus bars 106 and 108 having a white and black color code, respectively, extend across the outlet box, to connect the outlets 82 and 86 so that one conductor of each of these outlets is at the potential of the white bus bar 106 and the other conductor of each of these outlets is at the potential of the black bus bar 108. Bus bar 110, having a black code, is connected to the bus bar 108 which also has a black code. Bus bar 110 extends across the outlet box in a direction transverse to bus bars 106 and 108 and into electrical connection with one of the conductors of the armored cable at outlet 88 (not shown in the drawing). The bus 112 which is also connected to the outlet 84, serves as a black code return bus from the outlet 84 to complete the switch loop for outlet 90. The inner end of the bus 112 is connected to the short sub-bus 99 which passes down through the opening 102 in the upper surface of plug 94 and into the upper end of passage 120 where it makes electrical contact with conductor 96 of cable 92.

The black bus 108 is offset above the black return bus 112 as indicated at 114 in order to prevent electrical contact between these two busses. The sub-bus 100 is electrically connected to the white code bus 106 and passes down through the opening 104 of plug 94 and into the upper end of passage 120 where it makes electrical contact with conductor 98 of the cable 92. A bus 116 is connected to the white code bus 106 and extends into electrical contact with a conductor of the outlet 88. The end of each sub bus 99 and 100 is split, as shown in Fig. 7. One half of the split end is connected as at 101 to the bus 112 or 106. The other portion of the split end extends to the outer edge of plug 94 where it snaps into a groove cut in the dielectric material of the plug member 94, as indicated at 103.

It can be seen that the electrical circuit of the center outlet 90 of the embodiment of Figs. 3, 4, 6 and 7 is completed in the following manner: from black code bus bar 103 through black code bus bar 110 to switch outlet 84, through a switch connected to outlet 84, back through black return bus bar 112 to sub-bus 99 and hence through opening 102 into passage 120 and into contact with conductor 96 of cable 92. Conductor 98 of cable 92 passes into electrical contact with sub-bus 100 and is connected to the opposite side of power at white code bus 106.

The wedge 97 has an angularly inclined innermost edge which extends parallel to the inclination of the upper end surface of passage 120. The screw 122 which passes through a suitable aperture in the cover member 20' may be tightened in such manner as to vertically move the wedge 97 along the slot 120 and into wedging engagement with the ends of the sub-busses 99 and 100 to thereby force the conductor 98 into electrical contact with the sub-bus 100 and the conductor 96 into electrical contact with sub-bus 99. The wedge 97 is of sufficient width to span the space between the sub-busses 99 and 100 so that the single wedge 97 acts upon both of the conductors 96 and 98 and both sub-busses 99 and 100.

It can be seen from the foregoing that there is provided in accordance with this invention an outlet box which greatly facilitates the making of electrical connections, thereby resulting in great saving of time in electrical wiring. The outlet box in accordance with the invention can be used in any situation where a conventional outlet box is used. The outlet box of the invention is particularly useful in difficult locations where hook-up work ordinarily consumes an excessive amount of time. As has been shown the outlet box in accordance with the invention is adapted for use with any of the various wiring combinations which are encountered in electrical wiring.

While there have been shown and described particular embodiments of the invention, it will be obvious to those skilled in the art the various changes and modifications can be made therein without departing from the invention and, therefore, it is aimed to cover all such changes and modifications as fall within the true spirit and scope of the invention.

Having thus set forth and disclosed the nature of this invention, what is claimed is:

An electrical outlet box comprising a generally rectangular casing apertured on its four sides to provide a plurality of electrical outlets, an insulating plug disposed in said casing adjacent each outlet, crossed pairs of bus bars disposed in said casing, said insulating plugs having passages for receiving said bus bars, and passages for receiving the conductors of electrical cables to be connected to said bus bars at said outlets, clamp means with said plug means and said cable, said clamp means extending through the apertures in said casing to grip each said plug means of the casing and to grip said cables exteriorly of said casing, wedge receiving slots in each plug communicating with the passages for said conductors and said bus bars, wedge means movable in each slot for causing said conductors to make electrical contact with their associated bus bars, means accessible from the exterior of said casing for moving said wedge means in said slots, each pair of bus bars comprising a hot bar and a cold bar, each bar having an offset portion to preclude contact with the opposite crossing bar, each hot bar being electrically connected to the crossing hot bar and each cold bar being connected to the crossing cold bar, an additional outlet extending in a direction perpendicular to said crossed bus bars, sub-bus bars connecting said crossed bus bars to said additional outlet, said additional outlet also having a plug therein and passages for said sub-bus bars and additional conductors, said last mentioned plug having a wedge receiving slot and a wedge movable therein, one pair of crossed bus bars being connected in series with said sub-bus bars, and the other pair of said crossed bus bars connected across said last mentioned pair to provide a switch loop for said additional outlet.

References Cited in the file of this patent

UNITED STATES PATENTS

| | | |
|---|---|---|
| 423,310 | Chamberlain | Mar. 11, 1890 |
| 502,083 | McEvoy | July 25, 1893 |
| 1,132,673 | Murray | Mar. 23, 1915 |
| 2,151,433 | MacTwiggan | Mar. 31, 1939 |
| 2,427,965 | Henderson | Sept. 23, 1947 |